(12) United States Patent
Ainger (10) Patent No.: US 10,914,621 B2
(45) Date of Patent: Feb. 9, 2021

(54) MONITORING OF FLUID FLOW IN AN OPEN CHANNEL USING AN OPTICAL FIBRE SENSOR

(71) Applicant: NURON LIMITED, London (GB)

(72) Inventor: Michael Ainger, London (GB)

(73) Assignee: Nuron Limited, London (GB)

(*) Notice: Subject to any disclaimer, the term of this patent is extended or adjusted under 35 U.S.C. 154(b) by 367 days.

(21) Appl. No.: 15/749,049

(22) PCT Filed: Jul. 28, 2016

(86) PCT No.: PCT/GB2016/052329
§ 371 (c)(1),
(2) Date: Jan. 30, 2018

(87) PCT Pub. No.: WO2017/021702
PCT Pub. Date: Feb. 9, 2017

(65) Prior Publication Data
US 2018/0216979 A1     Aug. 2, 2018

(30) Foreign Application Priority Data
Jul. 31, 2015   (GB) .................................. 1513509.8

(51) Int. Cl.
*G01P 3/36*     (2006.01)
*G01F 1/66*     (2006.01)
(Continued)

(52) U.S. Cl.
CPC .............. *G01F 1/661* (2013.01); *G01F 1/002* (2013.01); *G01F 1/7086* (2013.01);
(Continued)

(58) Field of Classification Search
CPC .......... G01F 1/661; G01F 1/002; G01F 1/247; G01F 1/7086; G01F 15/022;
(Continued)

(56) References Cited

U.S. PATENT DOCUMENTS

| 4,413,531 A | 11/1983 | Karplus et al. |
| 5,194,847 A | 3/1993 | Taylor et al. |
(Continued)

FOREIGN PATENT DOCUMENTS

| CN | 102128653 A | 7/2011 |
| CN | 105683497 A | 6/2016 |
(Continued)

OTHER PUBLICATIONS

British Search Report, dated Jan. 17, 2017, for British Application No. GB1613082.5, 1 page.
(Continued)

*Primary Examiner* — Mark Hellner
(74) *Attorney, Agent, or Firm* — Andrus Intellectual Property Law, LLP (57) ABSTRACT

A method and system for monitoring fluid flow in an open channel system, using an optical fibre that extends along at least a portion of the open channel system within the channel below the surface of the fluid. The method comprising sending light pulses into the sensor optical fibre, receiving backscattered light from the sensor optical fibre, and analysing properties of the backscattered light to obtain data representing strain along the sensor fibre. The strain data can be processed to derive information about the fluid flow, such as fluid depth, flow velocity and flow volume. A containment system for the optical fibre sensor may be included to protect the fibre and convert the pressure of a fluid in the open channel to a strain in the fibre. The temperature of the fluid may also be measured and temperature compensation of the measured strain carried out. The system is particularly applicable to sewers, drains, culverts or levees, with the optical fibre sensor installed axially at the bottom of the channel.

30 Claims, 6 Drawing Sheets

(51) Int. Cl.
*G01L 11/02* (2006.01)
*G01F 1/00* (2006.01)
*G01L 1/24* (2006.01)
*G01F 15/02* (2006.01)
*G01F 1/708* (2006.01)
*G01F 23/292* (2006.01)
*G01D 5/353* (2006.01)

(52) U.S. Cl.
CPC .......... *G01F 15/022* (2013.01); *G01F 15/024* (2013.01); *G01F 23/292* (2013.01); *G01L 1/247* (2013.01); *G01L 11/025* (2013.01); *G01D 5/35358* (2013.01)

(58) Field of Classification Search
CPC .... G01F 15/024; G01F 23/292; G01L 11/025; G01D 5/35358
USPC .......................................................... 356/28
See application file for complete search history.

(56) References Cited

U.S. PATENT DOCUMENTS

| | | |
|---|---|---|
| 8,743,351 B2 | 6/2014 | Christian et al. |
| 2002/0028034 A1 | 3/2002 | Chen et al. |
| 2002/0040963 A1 | 4/2002 | Clayton et al. |
| 2003/0140711 A1 | 7/2003 | Brown |
| 2004/0112596 A1 | 6/2004 | Williams |
| 2006/0071158 A1* | 4/2006 | Van Der Spek ...... E21B 47/102 250/227.14 |
| 2006/0165344 A1 | 7/2006 | Mendez et al. |
| 2008/0000307 A1* | 1/2008 | Gysling ................ G01F 1/7086 73/861.44 |
| 2008/0068606 A1 | 3/2008 | Rogers et al. |
| 2017/0175465 A1* | 6/2017 | Dickenson ............ E21B 47/123 |

FOREIGN PATENT DOCUMENTS

| | | |
|---|---|---|
| JP | 2009236777 A | 10/2009 |
| NL | 1018324 C2 | 12/2002 |
| WO | 2008/009964 A2 | 1/2008 |
| WO | 2009/087371 A1 | 7/2009 |
| WO | 2014/068308 A1 | 5/2014 |

OTHER PUBLICATIONS

Masoudi et al., "A distributed optical fibre dynamic strain sensor based on phase-OTDR," *Meas. Sci. Technol.* 24:8, Jul. 5, 2013 (8 pages).

* cited by examiner

200~# MONITORING OF FLUID FLOW IN AN OPEN CHANNEL USING AN OPTICAL FIBRE SENSOR

TECHNICAL FIELD

The present invention relates generally to monitoring fluid in an open channel, such as a sewer, drain or watercourse.

BACKGROUND

Open-Channel (fluid) Flows are those liquid flows within a conduit where there is a free surface, as (normally) the upper surface of the fluid is not in contact with, and hence constrained by, the enclosing conduit. Open Channel fluid flows occur, for example and under normal operating conditions, in sewers, rivers, drains, culverts and levees. These are described as 'open-channel systems'.

In the past many of these open channel systems have been monitored and managed to a very limited extent compared to closed channel pipe flow systems, such as oil pipelines. However it is recognised as being increasingly essential to obtain accurate, continuous, wide area measurements from, in particular, open channel water flow systems, such as drains and sewers. This emerging requirement arises as a result of increasing flooding risk due to global warming and increased sensitivity to the environmental impact of failure or overloading of such systems.

The prior measurement and monitoring art for open-channel flow has included various types of mechanical and electromechanical flow meters, Doppler acoustic instruments (see e.g. U.S. Pat. No. 4,413,531) and Doppler laser flow meters (see e.g. U.S. Pat. No. 8,743,351). All of these prior art flow meters require to some degree installation of measuring equipment at the point at which the measurement is to be taken. Consequently, they do not lend themselves economically to widespread distributed installations.

SUMMARY OF THE INVENTION

In general terms, the invention proposes the use of an optical fibre sensor system within a conduit of an open channel system to monitor characteristics of an open channel fluid flow in the conduit. This approach can enable continuously distributed monitoring, in contrast to the known 'spot' measuring systems referred to above. As such, it would be of significant value to system operators, as it would allow continuous measurements within otherwise inaccessible locations, such as within sewers and similar conduits.

In the present application references to an open channel system are intended to refer to as system in which liquid flows within a conduit where there is a free surface, as (normally) the upper surface of the fluid is not in contact with, and hence constrained by, the enclosing conduit. As already noted above, Open Channel fluid flows occur, for example and under normal operating conditions, in sewers, rivers, drains, culverts and levees. The present invention is not intended to be applicable to closed flow systems such as hydrocarbon production systems or closed flow parts thereof (e.g. a hydrocarbon flowline; a floating production system (including pipeline systems connecting to one or more wells): a hydrocarbon well, etc).

More specifically, in a first aspect the invention provides a method of monitoring open-channel fluid flow in an open channel system, the method using an optical fibre that extends along at least a portion of the open channel system within the channel below the surface of the fluid, the method comprising:
 sending light pulses into the sensor optical fibre;
 receiving backscattered light from the sensor optical fibre; and
 analysing properties of the backscattered light to obtain data representing strain along the sensor fibre.

Strain is produced in the sensor optical fibre by the pressure imposed on the fibre by fluid flowing in the open channel. Thus, the strain in the fibre can be utilised to determine characteristics of the fluid flow.

The strain data may be processed to derive information about the open-channel fluid flow in the conduit of the open channel system. For example, one or more parameters describing the fluid flow (e.g. fluid depth, fluid flow velocity, fluid flow volume (i.e. volumetric flow rate) may be derived directly or indirectly from the strain data.

Further information about the fluid flow can be derived by recording the parameters for a plurality of sequential points in time and in order to identify changes in the parameters over time.

It may also be desirable in some applications of the invention to record the parameters for a plurality of measuring points along the length of the sensor optical fibre. This enables differences in the parameters between those measuring points to be determined at a given point in time, as well as monitoring of changes in those differences over time. Advantageously, the invention may be configured to record parameters at measuring points arranged contiguously over many kilometres, or may be configured such that an operator can select only limited numbers of measuring points. Measuring points may be fixed, but more usually will be selected as required by the operator from a workstation.

An operator might be interested, for example, in a difference in fluid velocity, a difference in fluid depth; and/or a difference in fluid volume at one measuring point over time, between two measuring points at a given point in time or between two measuring points over time.

In some embodiments, it will be desired to present the acquired/calculated information about the open channel fluid flow to an operator. To facilitate this, methods in accordance with embodiments of the invention may comprise generating one or more reports based on the information.

Changes in the information outside expected norms may indicate problems with the open channel system. In some embodiments, therefore, the method also includes generating an alert when the information about the open channel fluid flow exceeds a predetermined threshold.

Temperature changes in the conduit will generally influence the strain in the sensor optical fibre. Especially in embodiments where temperature of fluid is not required to be measured, this could lead to errors in the measurements and consequently errors in the primary information required to be derived from the measured strain data. In some embodiments, to counter this potential problem, the method includes measuring temperature in the conduit and using the measured temperature to temperature compensate the primary information derived from the measured strain. In other embodiments, where temperature is required to be measured, the temperature measurements are also used independently for this purpose.

The backscattered light may be analysed to obtain the data representing strain using optical time domain reflectometry (OTDR). In other embodiments optical frequency domain reflectometry (OFDR) is used. In some embodiments an OTDR measures Rayleigh backscatter. In other embodiments, the OTDR measures other backscatter phenomena including but not limited to: Brillouin and Raman, or measures more than one of these. In some embodiments, more than one measuring fibre and/or more than one interrogation method is employed.

The data representing the strain in the fibre and the information derived from the strain data may be stored in digital memory. To help minimise the memory requirements, the data representing the strain can be stored in a first memory and the information derived from the strain data be stored in one or more further memories. In this way the strain data in the first memory can be overwritten periodically once it has been used to derive the information, without risk of losing the derived information itself, which will be used subsequently for reporting for example.

In a second aspect, the invention provides a monitoring system for monitoring open-channel fluid flow in an open channel system, the monitoring system comprising:
 a sensor optical fibre for installation in a conduit of the open channel system;
 an optical apparatus (e.g. an optical interrogator) optically coupled to the sensor optical fibre and comprising a light source for sending light pulses into the sensor optical fibre and a light detector for receiving backscattered light from the sensor optical fibre; and
 an analyser for analysing properties of the backscattered light to generate data representing strain along the sensor optical fibre.

The analyser may be adapted to generate data representing strain at a plurality of discrete measuring points along the sensor optical fibre.

In some embodiments, the system also includes a data processor for processing the strain data to derive information about the open-channel fluid flow in the conduit of the open channel system. The system may also include a report generator for generating one or more reports based on the information about the open channel fluid flow and/or an alert generator for generating an alert when the information about the open channel fluid flow exceeds a predetermined threshold.

The analyser, data processor, report generator and alert generator may all be implemented in software executing on conventional computer hardware, such as a PC or a distributed computing environment. Two or more of the functions may be combined in a single software program.

In some embodiments, the system may include a temperature sensor to measure temperature in the conduit. Where a temperature sensor is used, the analyser and/or the data processor can be adapted to use a measured temperature in the conduit to temperature compensate the measured strain and/or information derived from the measured strain. The temperature sensor may be a second optical fibre for installation in the conduit. It may be installed, for example, alongside the sensor optical fibre from which the primary strain measurements are taken, in a position selected to protect it from the majority of the strain from which the primary measurements are to be derived, but in a situation with as similar as possible temperature dependency and preferably running the full length of the sensor optical fibre, so that the temperature measurements taken to compensate strain data can be taken adjacent each measurement point on the sensor optical fibre.

The analyser may comprise an optical time domain reflectometer (OTDR).

In some embodiments, the sensor optical fibre may be configured to extend in the generally straight line parallel to the axis of the conduit of the open channel system. In other embodiments, the fibre may be configured to follow a serpentine path. However, it is preferred that the sensor optical fibre is not a coiled optical fibre.

In some embodiments, the system comprises a containment arrangement for the sensor optical fibre, the containment system protecting the fibre. Advantageously, the containment system may be configured as an efficient converter of the pressure of the fluid in the conduit to strain in the fibre. In this way, the strain can be much greater than a strain in the fibre that would be caused by the pressure absent the containment system. The containment system may also serve to thermally insulate the fibre from the fluid in the conduit. The containment system can also provide the above mentioned location for a separate fibre with similar temperature dependence but devoid of other strains (in embodiments where this feature is implemented).

In some embodiments the system may comprise more than one design of converter within the containment system, each optimised for a particular measurement, such that different measurements may be obtained at specifically selected intervals along the conduit.

In a third aspect, the invention provides an open channel system comprising:
 a conduit for an open-channel fluid flow; and
 a monitoring system for monitoring open-channel fluid flow according to the second aspect above, the sensor optical fibre of the monitoring system being installed within the conduit.

The sensor optical fibre is preferably installed in the lower half of the conduit and more preferably is installed axially at the bottom of the conduit.

The conduit may be a sewer or drain or culvert or levee for example.

In a fourth aspect, the invention provides analysis tools, which produce from the pressure (and in some cases temperature) data, specific measurements of interest and value to an operator, which may include, for example:
 the velocity of the fluid flow
 the level of the fluid
 the flow rate (i.e volume over any time interval)

These analysis tools may include the recording of the fourier spectrum produced by a single or a plurality of surface waves at the air/fluid boundary at each measuring point and the extraction of the amplitudes and frequencies of the fourier components within this spectrum which relates to the surface wave profile.

They may also include the measurement of the amplitude and longitude profiles of a single, or a plurality, of waves with respect to the fluid flow and the utilisation of these to determine characteristic of the flow.

Further the surface wave profile may be compared to a library of known operational conditions within the channel to produce information relating to flow conditions and/or may have discrete algorithmic processes applied which relate the surface wave to the aforementioned measurements of interest. The aforementioned fourier analysis is advantageously performed over a frequency range of between 5 Hz and 1 kHz.

Further, the analysis tool may utilise the differentials between measurements taken from different points in the conduit to derive information regarding the single or the plurality of surface waves, and hence the flow of fluid.

In some incarnations, the invention includes one or any combination of two or more (and in some cases all) of the following further features:

The invention may include analysis techniques to utilise the optical fibre strain profile to identify structural changes and stresses within the conduit, using methods which will be clear to those skilled in the art.

The invention may be integrated within and used in conjunction with an automation system which provides real time control of devices for control of the flow within the conduit, such as actuators, pumps, valves or suchlike.

Embodiments of the invention may also advantageously be deployed within a system that combines one or more optical fibres for fluid sensing with optical fibres for other purposes, such as communications, other measurements and/or control.

DETAILED DESCRIPTION

The invention will now be further described with reference to the following non-limiting Figure and Example. Other embodiments of the invention will occur to those skilled in the art in the light of these.

Embodiments of the present invention are concerned with methods and systems for monitoring of a fluid within an open channel system, such as a sewer, drain or watercourse.

Figure 1:
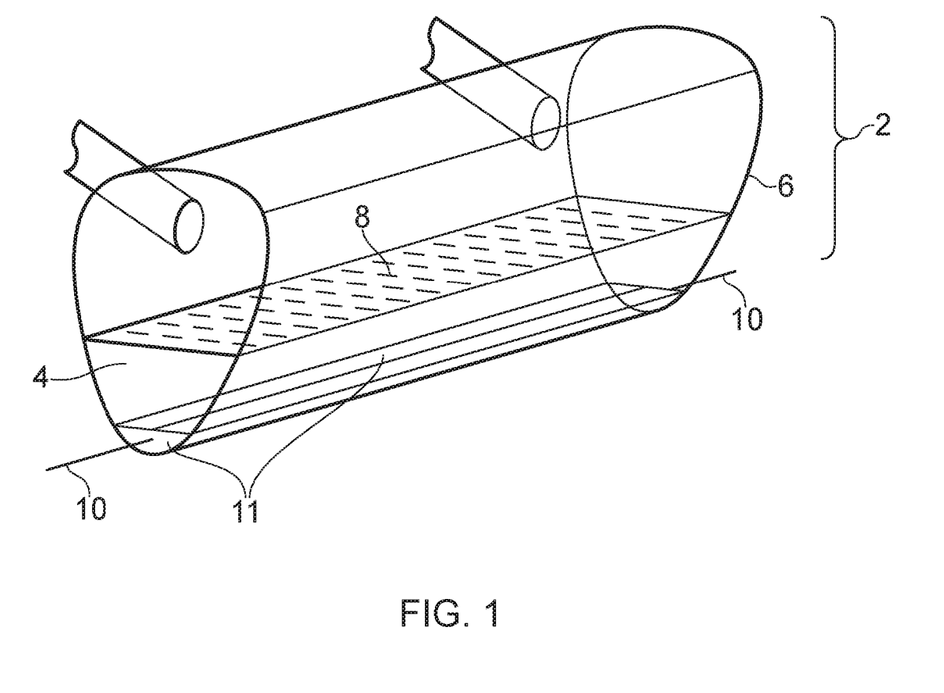
FIG. 1 shows an example of a channel for open flow, e.g. a sewer, having a sensor optical fibre installed therein in accordance with an embodiment of the present invention.

FIG. 1 illustrates one example of an open channel system 2, in which a fluid 4 flows within a conduit 6. The fluid has a free upper surface 8 that, as illustrated, is not in contact with (and hence not constrained by) the conduit under normal flow conditions. This so-called open-channel fluid flow is commonly found, under normal operating conditions, in sewers, drains, rivers, culverts and levees, all of which are examples of open-channel systems. Whilst in the illustrated example the conduit 6 is closed (i.e. the conduit encloses the space above the free surface 8 of the fluid 4), embodiments of the invention are also operable in open channel systems in which the conduit (or other channel) is open at the top.

In the example illustrated in FIG. 1, a sensor optical fibre 10 is installed at the base of the open channel system 2, in a manner specifically designed to both protect the fibre 10 and enable the required measurement sensitivity. An optical interrogator launches light pulses into the sensor fibre 10, and receives light backscattered within that fibre 10. From the properties of this backscattered light, strain variations in the fibre can be determined in order to measure pressure fluctuations along the sensor fibre 10. An analyser is used to process these measurements and apply algorithms to detect characteristics of importance to the operators of the open channel system 2 and provide reports and alerts.

The use of optical fibres as sensors has become increasingly widespread for measuring strain in structures (see e.g. US20020028034), for intrusion detection in security situations (see e.g. U.S. Pat. No. 5,194,847) and pipeline leak and intrusion detection (see e.g. WO2009087371A4). Such systems are often describes as Digital Acoustic Sensing or DAS systems.

However, in the open channel flows found in watercourses, sewers and drains, in order to obtain the range of parameters sought, a DAS must be able to measure (or compute from other measurements) 'slow changes' in pressures caused by variation in fluid depth of between 0-20 m of water, or 0-2 MPa. However it must also be able to measure 'fast changes' in pressure associated with surface waves, at typically up to 1 kHz, and in some cases between 1 Hz and 100 kHz, and typically as little as 2 Pa but in some cases between 0.1 Pa and 10 Pa, in order to be able to derive the full range of required flow parameters. These particularly ranges and demanding tolerances arise due to the absence of pressurisation in the conduit, unlike closed channel or pipe flows as are found in well boreholes and pipelines. However, it is also necessary to protect the fibre from the potentially harsh environment in the conduit, so some form of robust containment is generally desired, which potentially conflicts with the requirement for sensitivity to small changes in pressure.

Masoudi et al (Meas Sci and Technol 24 (2013) 085204) have demonstrated that current generations of Phase OTDR, with certain refinements, can reliably resolve strain variations of 20 n$\epsilon$, and one embodiment of the invention employs this technique, the benefits of which have not been previously known to or recognised by those skilled in the art of open channel flow monitoring.

In embodiments of the present invention, unlike prior open channel flow sensing techniques, an optical fibre DAS can beneficially be placed at the base of an open channel conduit, rather than extraneous to the flow. This, when combined with the contiguous nature of an optical fibre in the base of a sewer (or other open channel conduit), is capable of delivering a range of measurements not previously possible, and not previously known about or thought possible by those skilled in the art of open channel flow monitoring.

The installation of optical fibres in sewers has been employed over many years. WO2008009964 and others described systems of 'loose laid' cables, which would be unsuitable for many reasons, including the risk of damage and bio-fouling at the base of the sewer and the high attenuation of pressure signals which would be imposed by the armouring necessary. Both NL1018324 and WO2014068308A1 overcome the damage and bio-fouling risks by using resin or other flowable and hardenable medium to encase the ducts or cables. However, the attenuation by the quantity of the media between the fluid and the sensing fibre (the flowable hardenable medium, then the duct or cable wall/sheath, then an air space), results in strain in the optical fibre of insufficient magnitude in the presence of the pressure fluctuations required to be measured.

Furthermore, the spacial resolution required in order to resolve the combination of fast changes in pressure due to surface waves and the accuracy to localise operational problems (e.g blockages), requires a measurement resolution of advantageously around 50 mm and more generally in the range 5 mm-100 mm, which would further impair the sensitivity of typical prior DAS systems.

When taken together, the low amplitude of the pressure fluctuations, combined with material attenuation and short measuring gauge length would result in strains around 100× below the magnitude measurable using a combination of prior DAS systems and a typical sensing optical fibre.

In order to overcome this some embodiments of our system employ:

A DAS with sensitivity and resolution as described in Masoudi et al, or a technology with equivalent performance; and a containment system with pressure to strain transduction performance of typically 10 nε per Pa, and in some cases between 0.5 and 50 nε per Pa.

In the exemplary system, it is proposed to use a containment system to protect the optical fibre and secure it in position at the base of the channel. In this example, the containment system is additionally designed to provide an enhancement of the strain created in the sensing optical fibre when compared to a non-contained bare optical fibre. This may be achieved, for example, by appropriate selection of the shape, configuration and materials of the containment system. In some cases the containment system will exhibit a pressure to strain transduction performance of up to 50 nε per Pa, and in some cases greater than 0.5 nε per Pa.

A particular feature of wastewater systems is that the most significant increases in depths of flow will almost always be accompanied by some reduction in temperature. It is important in this regard to appreciate that both strain and other parametric changes are created in the optical fibres proportional to temperature. Slow changes in temperature variation can mask the slow changes in pressure which the exemplary system is required to measure. Advantageously, it is proposed that the invention provides compensation for this unwanted effect and/or that the fibre sensing the primary measurement characteristics is designed to minimise the impact of environmental temperature changes.

In some example systems, the containment system may also be designed by means of a combination of insulation and low temperature coefficient of the containment, to limit temperature fluctuation.

In other embodiments of the system, for example where such a combination of insulation and temperature independence is insufficient to provide the measuring accuracy required, embodiments of the invention may include a separate sensing fibre deliberately situated along the conduit in a position designed to permit thermally induced change, for example for each degree Celsius in temperature, there will occur a change in fibre parameters equivalent to 10με of pressure related strain, whilst the change in strain due to pressure change in this fibre will be significantly lower than the first fibre (which is in a position optimised for pressure induced strain).

The two optical fibres described above may be spliced to one another at the end of the system remote from the sensing instrument, such that the instrument generates two sets of spatially separated data, one of which is highly temperature dependent, the other being highly pressure dependent. A simple comparison process is able to calculate, and hence compensate for the effect on strain caused by temperature. Using a temperature sensing fibre in this manner also enables the system to measure temperature.

We now consider the operation of an exemplary system in more detail.

Figure 2:
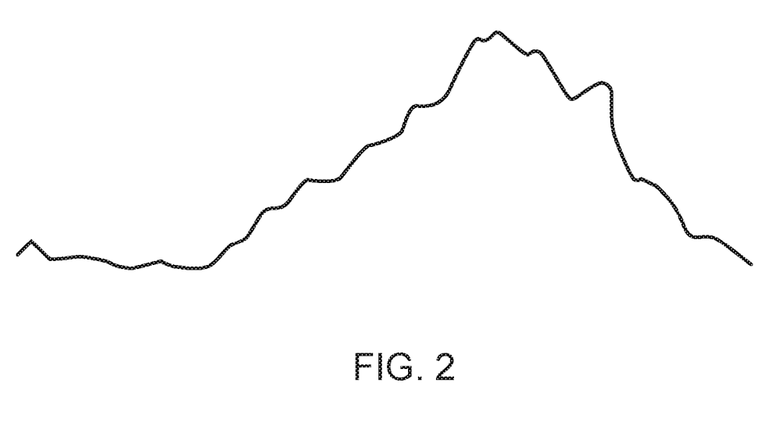
FIG. 2 shows an example of a surface wave present in an open channel flow, which give rise to the fourier components, the profile of which is measured by the invention.

FIG. 2 illustrates one example of a surface wave profile found at the boundary between the flowing fluid and the air, and caused by a variety of factors the radiation of pressure fluctuations caused by discontinuities at the base of the fluid such as joints, steps in level or constraining features. These surface waves are non-sinusoidal and result in a complex variation in pressure at the base of the fluid flow which this invention is designed to measure.

Figure 3:
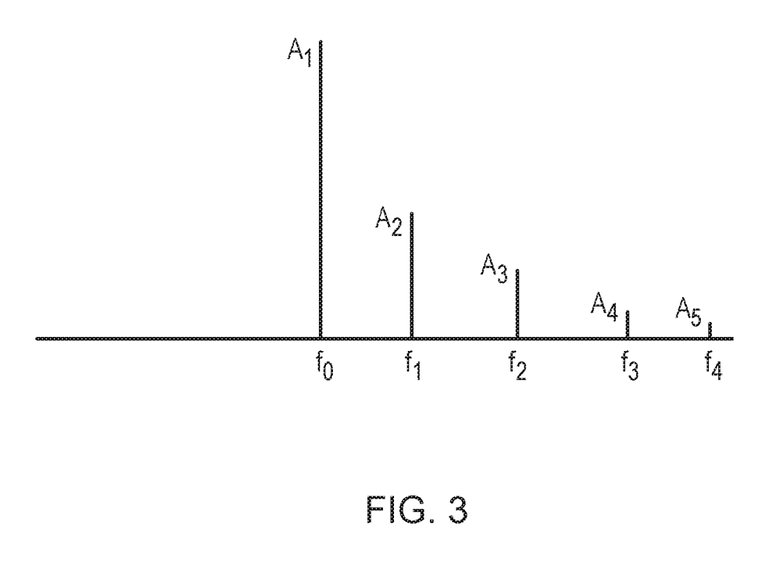
FIG. 3 shows an example of the Fourier components of such a wave.

FIG. 3 illustrates a series of Fourier components to which a complex surface wave such as that shown in FIG. 2 can be reduced, being one of the analysis methods which the invention utilises to characterise the fluid flow conditions.

In the exemplified system, it is proposed to collect pressure induced strain measurements using a phase OTDR instrument as described in Masoudi et al.

Figure 4:
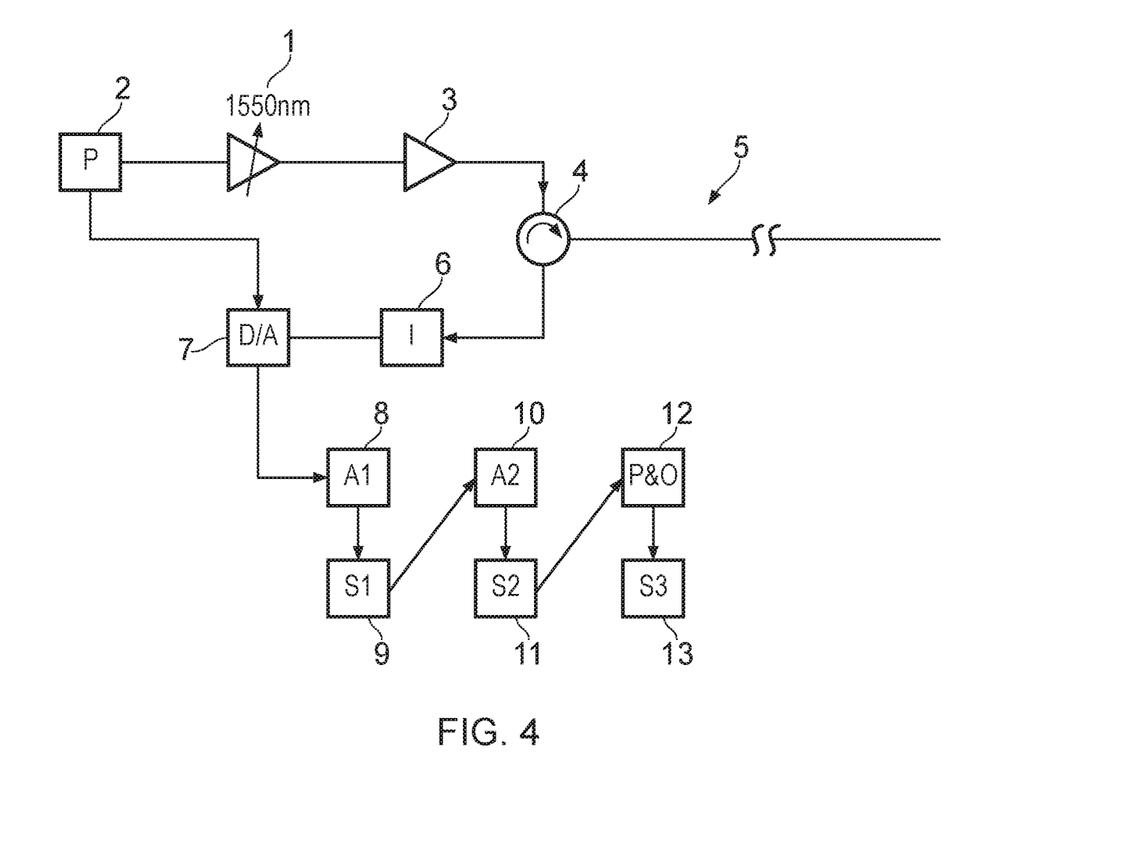
FIG. 4 shows a schematic of the system.

FIG. 4 illustrates the configuration of the system. Pulses of light are produced by a laser 1, controlled by a pulse generator 2. They are amplified by an amplifier 3 before being coupled via a circulator 4 to the sensing fibre 5. This sensing fibre may be many kilometres in length. Light is backscattered from non-homogenalities in the optical fibre, and the backscattered light is modulated by the physical strain experienced by the optical fibre at any given point. This modulated backscatter arrives back at the circulator 4 and is now directed to the interferometer 6, which produces an output signal proportional to the extent of modulation of the light which in turn is proportional to the strain in the fibre. This output is sampled by a Digital to Analogue convertor 7 to produce a digital representation of the strain in the fibre. As the Digital to Analogue convertor is triggered by the pulse generator caused the light pulse to be generated, a precise timing and hence a precise distance which the light has travelled can be associated with each sample. This is fed to a first analyser 8, which usually comprises an industrial PC or workstation, which performs rapid post-processing of all the digital samples to derive and then store the characteristics of each singular surface wave at each singular measuring point, such that in turn the characteristics of a plurality of surface waves at a plurality of measuring points are stored. Due to the very large amount of data which must be processed quickly by analyser 1, it is advantageous to perform further processing, namely the extraction of the fourier data, differential comparisons of data between measuring points, comparison of wave profiles to library profiles and the other steps necessary to produce the fluid flow information in analyser 2 10. Analyser 2 then stores this data in a second storage area 2. Finally the presentation and operation system 12 is concerned with reporting and displaying data in a user friendly and configurable manner and will usually have it's own storage area 3 13 for reports, alerts produced and trend data.

The measurement points along the fibre are set to those required by the application. For example a measuring point every 100 m along a sensing fibre of 10 km would result in 100 measuring points.

Data collected from the interrogator for each measuring point, based on the backscattered light from the fibre, is processed by the analyser to obtain the desired information about the open channel flow.

In a first processing step, the phase perturbation output from a digital implementation of the 'differentiate and cross multiply'—scheme as described in Masoudi et al, implemented by a first stage processor for each measurement point is written to the first stage storage medium. This is repeated at a repetition rate of between 1 kHz and 30 kHz. The processing of this data is described with reference to FIG. 6. The first processing step may include other schemes optimised for operation at lower frequencies or over larger dynamic range than depicted in Masoudi et al.

Figure 6:
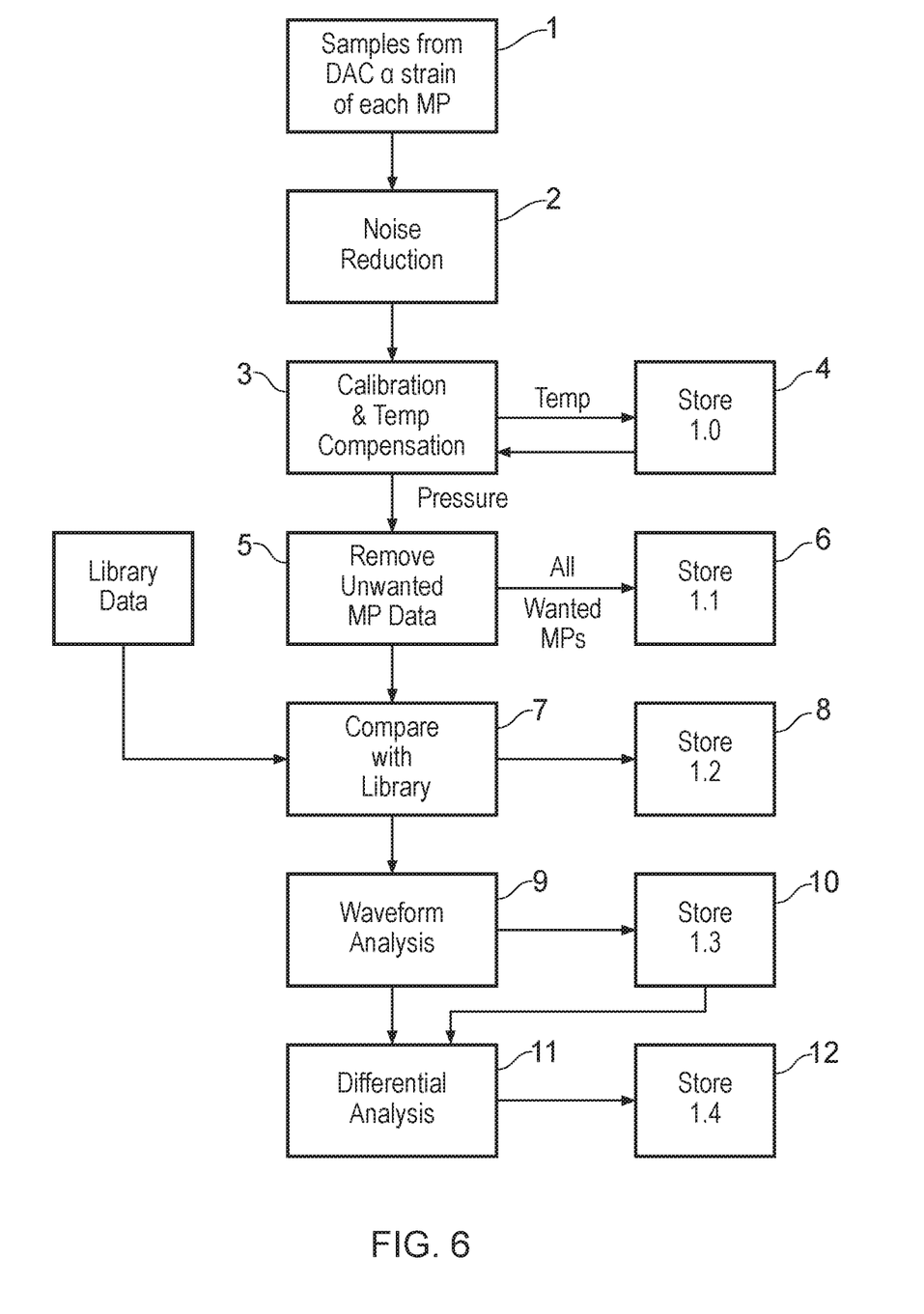
FIG. 6 is a diagramatic representation of the analysis process.

FIG. 6 shows a schematic representation of the analysis process performed by the first two analysers. Samples from the Digital to Analogue Convertor which are proportional to the strain at each measuring point 1 are subjected to a noise reduction process 2 (including for example multi-sample averaging and filtering) to remove as far as possible system and environmental noise. The results are first compensated for temperature and system calibration data 3, the temperature component of which may be updated and stored 4 for use in applications where temperature data is required to be used by the operator. The result is accurate pressure values, which are subjected to a selection process discarding any which are not required to be utilised 5, for example because it represents a particular measuring point which has not been selected by the operator. All other data is stored 6, so that it may be accessed subsequently for detailed diagnostics or engineering purposes. These pressure values may now be compared with library values on a per measuring point basis 6, with the correlation levels being stored 8. The waveforms of single and multiple surface waves are now analysed 9, with the extracted parameters stored 10. Differential analysis between waves at different measuring points is now conducted 11, before the results are stored 12.

Figure 5:
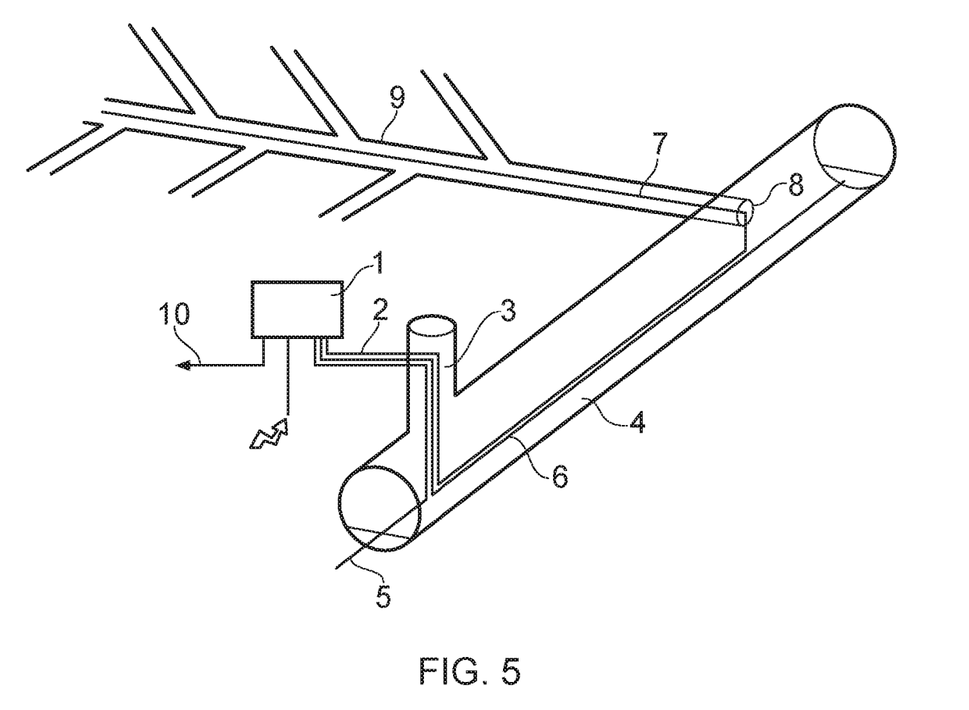
FIG. 5 shows the typical configuration of a conduit system with the system installed.

FIG. 5 illustrates the system as may be installed in a drainage or sewerage system. The interrogator 1 is installed in a street cabinet or in a nearby building where it may be safely and conveniently provided with access and a power supply. The interrogator may (but is not necessarily) close to a manhole or access chamber to the drain or sewer 3. One or more optical fibres 2 exit the interrogator cabinet 1 and descend the manhole or chamber 3 into the sewer or drain 4. In the illustration shown one optical fibre 5 is routed in one direction (to monitor the fluid flow and condition in that direction), and two more 6 and 7 are routed in the opposite direction. Of these, one 6 is routed along the original sewer to monitor it's fluid flow and condition, while the other 7 exits that sewer at a lateral connection 8 and is used to monitor that laterally connected sewer 9. Finally, the interrogator is connected to the analysers by a communications connection 10, which may be an optical fibre routed through the sewers along with the monitoring fibres, or may be a commercially provided optical fibre or other suitably dimensioned communications media.

Embodiments of the invention can also include a management system for presenting the data to one or more operators, for example in a control room, which allows for alerts to be set on threshold values being crossed, trend data to be displayed and both graphical and tabular measurements and reports to be produced.

The analysers and management system and associated storage media can advantageously be assembled using high performance workstations and associated Information Technology as will generally be found in many industrial or corporate environments.

The skilled person will appreciate that the systems and methods described above are examples embodying inventive concepts described herein and that many and various modifications can be made without departing from the invention.

The invention claimed is:

1. A method of monitoring fluid flow in a conduit of an open channel system, the fluid flow having a free surface, the method using a sensor optical fibre that extends axially along at least a portion of the conduit of the open channel system at the base of the conduit below the surface of the fluid configured so that pressure fluctuations in the fluid resulting from surface waves on the free surface of the fluid flow cause strain fluctuations in the sensor optical fibre, the method comprising:
sending light pulses into the sensor optical fibre;
receiving backscattered light from the sensor optical fibre;
analysing properties of the backscattered light to obtain data representing strain along the sensor optical fibre resulting from the surface waves; and
processing the strain data to derive information about the fluid flow in the conduit of the open channel system, wherein said information is one or more parameters describing the fluid flow including at least volumetric fluid flow rate; wherein the backscattered light is analysed to obtain the data representing strain using one or more of: optical time domain reflectometry and optical frequency domain reflectometry.

2. A method according to claim 1 where the sensor optical fibre is within a containment system to protect the sensor optical fibre and secure it in position at the base of the channel.

3. A method according to claim 1, wherein the one or more parameters further include at least one of:
fluid depth; and
fluid flow velocity.

4. A method according to claim 1, comprising recording at least one parameter of the fluid flow for a plurality of sequential points in time and said information about the open channel fluid flow comprises changes in said parameter over time.

5. A method according to claim 1, wherein said one or more parameters of the fluid flow are determined for a plurality of measuring points along the length of the sensor optical fibre.

6. A method according to claim 5, further comprising comparing at least one determined parameter for two measuring points along the length of the sensor optical fibre and said information about the open channel fluid flow comprises a difference in said parameter between those measuring points at a given point in time.

7. A method according to claim 6, wherein said information is:
a difference in fluid velocity;
a difference in fluid depth; or
a difference in volumetric fluid flow rate.

8. A method according to claim 6, comprising recording the difference in said parameter of the fluid flow for a plurality of sequential points in time and said information about the open channel fluid flow comprises changes in said difference in the parameter between the two measuring points over time.

9. A method according to claim 2, further comprising generating one or more reports based on said information about the open channel fluid flow for providing to an operator.

10. A method according to claim 2, further comprising generating an alert when said information about the open channel fluid flow exceeds a predetermined threshold.

11. A method according to claim 1, further comprising measuring a temperature in the conduit and using the measured temperature to temperature compensate the measured strain and/or information derived from the measured strain.

12. A method according to claim 1, wherein the optical time domain reflectometry measures Rayleigh backscatter.

13. A method according to claim 2, wherein the data representing the strain in the fibre and said information derived from the strain data is stored in digital memory.

14. A method according to claim 13, wherein the data representing the strain is stored in a first memory and said information derived from the strain data is stored in one or more further memories, wherein the data in the first memory is overwritten periodically once the data has been used to derive said information.

15. A method according to claim 1, wherein the conduit is a sewer or a drain.

16. A monitoring system for monitoring open-channel fluid flow in an open channel system, the monitoring system comprising:
a sensor optical fibre for installation in a conduit of the open channel system, the sensor optical fibre being adapted to be installed in the base of the conduit and extend axially along the conduit, the sensor optical fibre being configured so that pressure fluctuations in the fluid resulting from surface waves on the free surface of the fluid flow cause strain in the sensor optical fibre;
an optical apparatus optically coupled to the sensor optical fibre and comprising a light source for sending light pulses into the sensor optical fibre and a light detector for receiving backscattered light from the sensor optical fibre; and
an analyser for analysing properties of the backscattered light to generate data representing strain along the sensor optical fibre resulting from the surface waves; and
a data processor for processing the strain data to derive information about the fluid flow in the conduit of the open channel system, wherein said information is one or more parameters describing the fluid flow including at least volumetric fluid flow rate; wherein said analyser comprises one or more of: an optical time domain reflectometer; and an optical frequency domain reflectometer.

17. A system according to claim 16, wherein the analyser is adapted to generate data representing strain at a plurality of discrete measuring points along the sensor optical fibre.

18. A system according to claim 16, further comprising a report generator for generating one or more reports based on said information about the open channel fluid flow.

19. A system according to claim 16, further comprising an alert generator for generating an alert when said information about the open channel fluid flow exceeds a predetermined threshold.

20. A system according to claim 16, further comprising a temperature sensor to measure temperature in the conduit, wherein the analyser and/or the data processor are adapted to use a measured temperature in the conduit to temperature compensate the measured strain and/or information derived from the measured strain.

21. A system according to claim 20, wherein the temperature sensor is a second optical fibre for installation in the conduit.

22. A system according to claim 16, wherein the conduit is a sewer or a drain.

23. A system according to claim 16, further comprising a containment system for the sensor optical fibre, the containment system protecting the fibre.

24. A system according to claim 23, wherein the containment system thermally insulates the fibre from the fluid in the conduit.

25. A system according to claim 23, wherein the containment system is configured to be secured to the wall of the conduit of the open channel system.

26. An open channel system comprising:
a conduit for an open-channel fluid flow; and
a monitoring system for monitoring open-channel fluid flow according to claim 16, the sensor optical fibre of the monitoring system being installed within the conduit axially along the base of the conduit.

27. An open channel system according to claim 26, wherein the conduit is a sewer or drain or culvert or levee.

28. An open channel system according to claim 26, further comprising one or more additional optical fibres to be used for communication, other measurement and/or control functions.

29. A system according to claim 28, wherein the sensor optical fibre and the one or more additional optical fibres are retained in a containment system that is common to all of the fibres.

30. A control system for an open channel system, the control system comprising a monitoring system according to claim 16 and one or more automation controls for operating flow control devices within the open channel system based on outputs from the monitoring system.

* * * * *